W. F. DEHUFF.
DOUGH MIXER.
APPLICATION FILED JUNE 2, 1919.

1,329,164.

Patented Jan. 27, 1920.

WITNESSES

Walter F. Dehuff, INVENTOR

BY

ATTORNEYS

UNITED STATES PATENT OFFICE.

WALTER FRANKLIN DEHUFF, OF GLEN ROCK, PENNSYLVANIA.

DOUGH-MIXER.

1,329,164.  Specification of Letters Patent.  Patented Jan. 27, 1920.

Application filed June 2, 1919. Serial No. 301,172.

*To all whom it may concern:*

Be it known that I, WALTER F. DEHUFF, a citizen of the United States, and a resident of Glen Rock, in the county of York and State of Pennsylvania, have invented certain new and useful Improvements in Dough-Mixers, of which the following is a specification.

My invention is an improvement in dough mixers, and has for its object to provide a machine of the character specified wherein a thorough agitation and blending of the material may be obtained, a bowl or mortar being provided and a pestle or beater, having a rotary movement and a bodily movement of transition to different parts of the mortar, and wherein means is provided for independently varying the speed of the vertical movement, and the speed of the transition.

Figure 1:
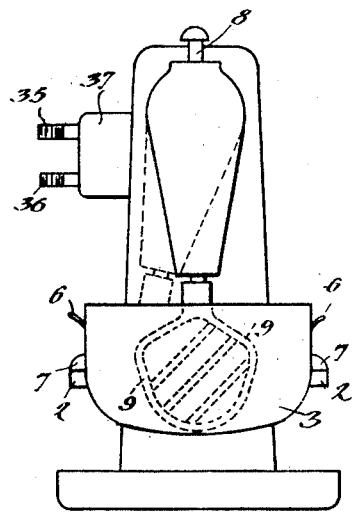
Figure 1 is a front view of the improved mixer.

In the present embodiment of the invention a suitable support 1 is provided in the form of a case, and this case has adjustable vertically thereof a bracket 2, which carries the mixing bowl or mortar 3.

The bracket 2 has grooves for engaging a vertical guide 4 on the case, and the bracket is held in adjusted position by a set screw 5. The bowl has handles 6 for convenience in manipulating the same, and has lugs 7 at its ends resting upon the bracket as shown.

The beater or pestle comprises a shaft 8 having at the lower end thereof a head 9 which is the beater and engages the dough in the bowl. This shaft extends upwardly through a casing 10, the upper end of the shaft having a head above the casing, and the casing has a hollow sleeve 11 extending laterally therefrom near the upper end and communicating with the interior of the casing.

This hollow sleeve is received within a bearing 12 in the top of the case 1, the said bearing being horizontal and being of considerable length, as shown. Bevel gears 13 and 14 are arranged on the shaft 8 and on a shaft 15 journaled in the hollow sleeve, the said bevel gears meshing to constrain the shaft 8 to rotate with the shaft 15. This shaft is journaled at the end remote from the gear 14 in a stepped bearing 16 in the case, and a transmission shaft 17 is journaled adjacent to the shaft 15, the shaft 17 being a hollow shaft, as shown, and having one section 18 of a clutch secured thereto outside of the casing.

A countershaft 19 is journaled parallel with the shafts 15 and 17, the shafts 15, 17 and 19 being journaled in a web 20 in the case and in bearings 16 and 21 at the end of the case. The movable portion 22 of the clutch is secured to a shaft 17ª arranged within the shaft 17, and a coil spring 24 is arranged between the movable portion of the shaft and a stop 25 on the hollow shaft 17. The spring acts normally to press the movable portion of the clutch toward the fixed portion and the shaft 17ª is moved in the opposite direction to disengage the clutch section by a wedge 40 which is mounted to slide in a guide 41 in the web 20 toward and from the shaft 17ª, and the inclined face of this web engages the inner end of the shaft 17ª.

Figure 2:
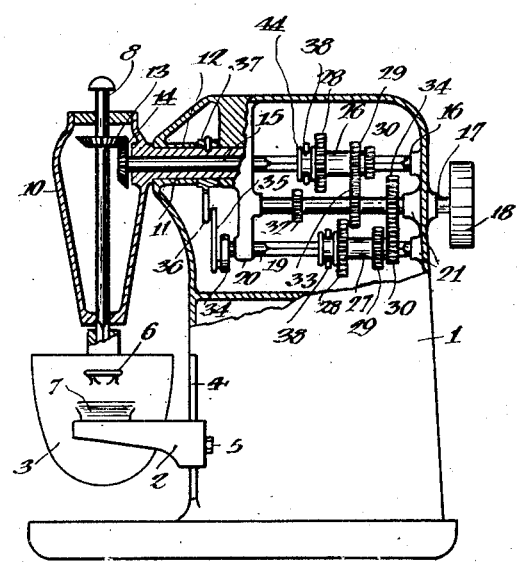
Fig. 2 is a side view with parts broken away.

Referring to Fig. 2, it will be seen that the shafts 15, 17 and 19 are polygonal in cross section, and sleeves 26 and 27 are mounted to slide on these polygonal portions of the shafts. The poylgonal portions and the hubs of the sleeves constitute a feathered arrangement for permitting the sleeves to slide freely on the shafts to constrain them to turn therewith.

Figure 3:
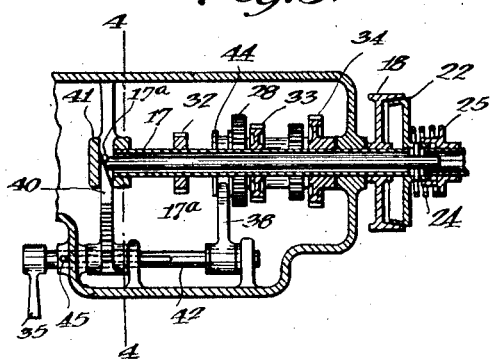
Fig. 3 is a partial horizontal section showing the transition.

The sleeves are similar, each carrying three gear wheels 28, 29 and 30, and each also has an annular groove or collar 31 at the end adjacent to the gear wheel 28. The shaft 17 has gear wheels 32, 33 and 34, which are adapted to mesh with the gear wheels 28, 29 and 30, respectively, and it will be noticed, referring to Figs. 2 and 3, that the gear wheels 28 and 34 are of approximately the same diameter and of larger diameter than the gear wheels 29, 30, 33 and 32.

The shaft 19 has at the inner end thereof a crank 34, which is connected by a link 35 with a radial arm 36 on a collar 37 which is pinned to the hollow sleeve 11 at the inner end of the bearing 12. It will be evident when the shaft 19 is rotated that a rocking or oscillating motion will be imparted to the bearing 11 and to the casing 10, thus rocking the beater, and moving it longitudinally of the bowl, so that the head of the beater will engage every part of the dough in the bowl.

With the parts in the position of Fig. 2, the gears 34 and 30 of the shafts 17 and 19 are in mesh, while the gears 29 and 33 of the shafts 15 and 17 are in mesh. Thus the shaft 19 will be driven on the low speed while the shaft 15 will be driven on the intermediate. Either sleeve 26 or 27 may move to bring the gear 28 into mesh with the gear 32 of the transmission shaft, or the sleeve 26 may be moved to bring the gear 30 into mesh with the gear 34 of the transmission shaft.

The sleeve 27 may be also moved to bring the gear 29 into mesh with the gear 33 of the transmission shaft. Thus three speeds are provided for each shaft 15 and 19, a high, a low and an intermediate speed, and these speeds are independent of each other. Either shaft may also be entirely disconnected from the shaft 19, to permit the beater to be merely swung or merely rotated. Each sleeve 26 and 27 is controlled by a handle 35 and 36, respectively, which are secured to shafts 42 and 43, to be described.

Each shaft 42 and 43 has a fork 38 whose arms engage an annular groove in the hub 44 of the adjacent gear wheel 28. These shafts 42 and 43 are mounted to rotate and to move longitudinally and each has a longitudinally extending groove provided with circumferential extensions which are adapted to be engaged by a pin 45 to hold the shaft with the sleeve 26 or 27, as the case may be, in adjusted position.

Figure 4:
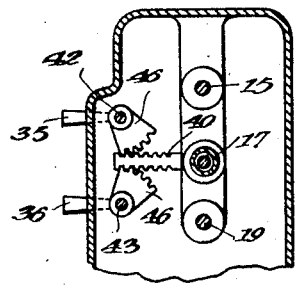
Fig. 4 is a section on the line 4—4 of Fig. 3.

To move the sleeve, the handles 35 or 36, as the case may be, are moved to the position shown in Fig. 4 from a substantially vertical position. This brings the longitudinally extending slot in the shaft 42 or 43, as the case may be, into register with the pin 45, permitting the shaft to move longitudinally to adjust the sleeve 26 or 27. The same movement, however, operates the wedge 42 to release the clutch 18—22. This release is brought about through gear sectors 46 secured to the shafts 42 and 43 and engaging rack teeth on the wedge 40. Whenever either shaft 42 is turned the first movement operates the wedge 40 to release the clutch 22. Until the clutch is released the shaft cannot be moved longitudinally to operate the sleeve 26 or 27. It will be understood that the handle 36 moves in the opposite direction to the handle 35 to bring the longitudinal slot into register with the pin.

It will be understood that the handle 36 moves in the opposite direction to the handle 35 to bring the longitudinal slot into register with the pin. It will be understood that the bowl is removable so that bowls of different size may be used. The beater is also detachable in order that bowls of different type may be used for different type of work.

I claim:

1. A dough mixer comprising a suitable support, a driving shaft journaled in the support, a beater, a bearing sleeve mounted to oscillate on the driving shaft and carrying a casing in which the casing is mounted to rotate, a driving connection between the driving shaft and the beater in the casing, means for rocking the sleeve, and a common controlling means for the driving shaft and for swinging the casing, and a bowl with which the beater coöperates.

2. A dough mixer comprising a bowl, a beater coöperating with the bowl and mounted to rotate in the bowl, means for rotating the beater, means for swinging the beater longitudinally of the bowl, a common driving means for the rotating means and the swinging means, and means for connecting either or both of the said means to the driving means.

3. A dough mixer comprising a bowl, a beater coöperating with the bowl, means for rotating the beater, means for swinging the beater, means for simultaneously controlling the rotating and the swinging means, and means for adjusting the bowl toward and from the beater.

4. A dough mixer comprising a bowl, a beater coöperating with the bowl, means for rotating the beater, means for swinging the beater, means for simultaneously controlling the rotating and the swinging means, and means for disconnecting the driving means from either the swinging means or the rotating means.

5. A dough mixer, comprising a bowl, a beater coöperating with the bowl, and a common means for rotating the beater and swinging it transversely of the axis of rotation of the bowl.

WALTER FRANKLIN DEHUFF.